United States Patent
Kahlen et al.

(10) Patent No.: US 11,203,683 B2
(45) Date of Patent: Dec. 21, 2021

(54) PP-RICH MATERIAL COMPOSITION HAVING HIGH STIFFNESS AND PROCESSABILITY

(71) Applicant: BOREALIS AG, Vienna (AT)

(72) Inventors: Susanne Kahlen, Linz (AT); Markus Gahleitner, Linz (AT); Cornelia Tranninger, Linz (AT); Bhawna Kulshreshtha, Vienna (AT)

(73) Assignee: BOREALIS AG, Vienna (AT)

( * ) Notice: Subject to any disclaimer, the term of this patent is extended or adjusted under 35 U.S.C. 154(b) by 54 days.

(21) Appl. No.: 16/607,331

(22) PCT Filed: May 2, 2018

(86) PCT No.: PCT/EP2018/061125
§ 371 (c)(1),
(2) Date: Oct. 22, 2019

(87) PCT Pub. No.: WO2018/206353
PCT Pub. Date: Nov. 15, 2018

(65) Prior Publication Data
US 2020/0385555 A1 Dec. 10, 2020

(30) Foreign Application Priority Data
May 8, 2017 (EP) .................................. 17169896

(51) Int. Cl.
*C08L 23/12* (2006.01)
*C08L 23/16* (2006.01)

(52) U.S. Cl.
CPC .............. *C08L 23/12* (2013.01); *C08L 23/16* (2013.01); *C08L 2205/035* (2013.01); *C08L 2207/02* (2013.01); *C08L 2207/20* (2013.01)

(58) Field of Classification Search
None
See application file for complete search history.

(56) References Cited

U.S. PATENT DOCUMENTS

| 7,767,761 | B2 | 8/2010 | Enrico et al. |
| 10,308,797 | B2* | 6/2019 | Lummerstorfer ....... C08L 23/12 |
| 2009/0048403 | A1 | 2/2009 | Costantini et al. |
| 2012/0178883 | A1* | 7/2012 | Massari .............. C08F 297/083 525/240 |

FOREIGN PATENT DOCUMENTS

| WO | 2007/071494 A1 | 6/2007 |
| WO | 2015/169690 A1 | 11/2015 |
| WO | 2016/005301 A1 | 1/2016 |
| WO | 2017/060139 A1 | 4/2017 |

OTHER PUBLICATIONS

Indian Office Action dated Sep. 7, 2020.

* cited by examiner

*Primary Examiner* — Richard A Huhn
(74) *Attorney, Agent, or Firm* — Tarolli, Sundheim, Covell & Tummino LLP

(57) ABSTRACT

The present invention relates to a polyolefin composition, the use of the polyolefin composition in a compound with one or more virgin polymers for automotive articles or applications, pipes or profiles for construction applications, the use of a heterophasic polypropylene (HECO) as compatibilizer for polyolefin blends A) between a copolymer of ethylene and one or more C4 to C19 alpha olefin B) and a reinforcing mineral filler D) as well as a process for producing the polyolefin composition.

12 Claims, No Drawings

PP-RICH MATERIAL COMPOSITION HAVING HIGH STIFFNESS AND PROCESSABILITY

The present invention relates to a polyolefin composition, the use of the polyolefin composition in a compound with one or more virgin polymers for automotive articles or applications, pipes or profiles for construction applications, the use of a heterophasic polypropylene (HECO) as compatibilizer for polyolefin blends A) between a copolymer of ethylene and one or more C4 to C19 alpha olefin B) and a reinforcing mineral filler D) as well as a process for producing the polyolefin composition.

Polyolefins, like polypropylene and polyethylene are typical commodity polymers with many application areas and a remarkable growth rate. The reason is not only a favourable price/performance ratio, but also the versatility of these materials and a very broad range of possible modifications, which allows tailoring of end-use properties in a wide range. Chemical modifications, copolymerisation, blending, drawing, thermal treatment and combination of these techniques can convert common-grade polyolefins to valuable products with special properties.

One major trend in the field of polyolefins is the use of recycled materials which derive from a great variety of sources. One of the key problems in polyolefin recycling, especially when dealing with material streams from post-consumer waste (PCW) is the difficulty to quantitatively separate polypropylene (PP) and polyethylene (PE). Commercial recyclates from PCW sources have been found generally to contain mixtures of PP and PE, the minor component reaching up to <50 wt.-%.

Such recycled PP/PE-blends normally suffer from deteriorated mechanical and optical properties, have poor performance in odour and taste and they generally suffer from poor compatibility between the main polymer phases, resulting in limited stiffness, impact strength and heat deflection resistance in relation to their processability and thus do not fit the customer requirements. Such inferior performance is partly caused by polyethylene with its lower stiffness and melting point forming the continuous phase even at polypropylene concentrations up to 65% because of the normally higher viscosity of the PE components in PCW.

This normally excludes the application of recycled materials for high quality parts, and it only allows the use in low-cost and non-demanding applications.

Therefore, there is still a need in the art for improving recycled materials in terms of their mechanical performances, i.e. improving the balance between stiffness, impact strength and heat deflection temperature, at good processability, i.e. at reasonable melt flow rate.

Thus, the object of the present invention is to obtain a polyolefin material of high stiffness, impact strength and heat deflection temperature as well as reasonable melt flow rate in order to make it suitable to be used for e.g. automotive applications.

The finding of the present invention is that with a special combination of a heterophasic polypropylene (HECO), a copolymer of ethylene and one or more C4 to C19 alpha olefin and a reinforcing mineral filler, with specific properties, a good balance of stiffness as well as impact strength and heat deflection temperature at reasonable melt flow rate for a blend of at least two different polyolefins, especially recycled PP/PE-blends, can be achieved.

Thus, the present invention is directed to a polyolefin composition comprising
A) 40 to 80 wt.-%, based on the total weight of the polyolefin composition, of a blend of at least two different polyolefins, comprising at least 65 wt.-%, based on the total weight of polyolefin blend, of polypropylene,
B) 14 to 60 wt.-%, based on the total weight of the polyolefin composition, of a heterophasic polypropylene (HECO), wherein
   i) the melt flow rate $MFR_2$ (230° C., 2.16 kg) measured according to ISO 1133 of the heterophasic polypropylene is at least 30 g/10 min,
   ii) the relative amount of the xylene cold soluble (XCS) fraction is at least 10.0 wt.-%, and
   iii) the intrinsic viscosity of the XCS fraction of the heterophasic polypropylene measured in decalin according to DIN ISO 1628/1 at 135° C. is at least 2.0 dl/g,
C) 3 to 12 wt.-%, based on the total weight of the polyolefin composition, of a copolymer of ethylene and one or more C4 to C19 alpha olefin having a density measured according to ASTM D792 in the range of 850 to 885 $g/m^3$ and a melt flow rate $MFR_2$ (190° C., 2.16 kg) measured according to ISO 1133 in the range of 0.05 to 5 g/10 min, and
D) 3 to 12 wt.-%, based on the total weight of the polyolefin composition, of a reinforcing mineral filler.

The inventors surprisingly found out that such a polyolefin composition has a good balance of high stiffness as well as high impact strength and heat deflection temperature, at reasonable melt flow rate and thus is suitable to be used for e.g. automotive applications.

Advantageous embodiments of the inventive polyolefin composition are defined in the corresponding sub-claims.

According to one embodiment, the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and more preferably from 22 to 35 wt.-%, based on the total weight of polyolefin blend, of polyethylene.

According to another embodiment, the inventive polyolefin composition has a melt flow rate $MFR_2$ (230° C., 2.16 kg) measured according to ISO 1133 in the range of 15 to 35 g/10 min.

According to yet another embodiment, the polyolefin composition has i) a tensile modulus measured according to ISO 527-3 in the range of 1000 to 1800 MPa, and ii) a Charpy notched impact strength measured according to ISO 179/1 eA at +23° C. in the range of 4.5 to 10.0 $kJ/m^2$ and iii) a heat deflection temperature (HDT) measured according to ISO 75 A in the range of 48 to 55° C.

According to one embodiment, the heterophasic polypropylene (HECO) has a xylene cold soluble (XCS) fraction measured according to ISO 16152 (23° C.) in the range of 12.0 to 30.0 wt.-%, based on the total weight of the heterophasic polypropylene (HECO).

According to another embodiment, the heterophasic polypropylene (HECO) has a comonomer content in the range of 2.0 to 15.0 wt.-%, based on the total weight of the heterophasic polypropylene (HECO).

According to yet another embodiment, the heterophasic polypropylene (HECO) comprises a) 70 to 90 wt.-% of a matrix (M) being a polypropylene selected from isotactic polypropylene homopolymers or random copolymers of propylene with ethylene and/or C4 to C8 alpha-olefins, and b) 10 to 30 wt.-% of an elastomeric propylene copolymer (EC) dispersed in said matrix (M).

According to one embodiment, the matrix (M) of the heterophasic polypropylene (HECO) has a melt flow rate $MFR_2$ (230° C., 2.16 kg) measured according to ISO 1133 in the range of 30 to 500 g/10 min.

According to another embodiment, the matrix (M) of the heterophasic polypropylene (HECO) has a) a comonomer content of equal or less than 1.0 wt.-%, and/or b) a xylene cold soluble (XCS) fraction measured according to ISO 16152 (23° C.) of equal or less than 3.5 wt.-%, based on the total weight of the matrix.

According to yet another embodiment, a) the comonomers of the elastomeric copolymer (EC) are ethylene and/or at least C4 to C10 alpha-olefin, and/or b) the amorphous phase (AM) of the xylene soluble fraction (XCS) of the heterophasic polypropylene (HECO) has a comonomer content of less than 50.0 wt.-%.

In a further aspect of the present invention, the use of a polyolefin composition as defined herein in a compound with one or more virgin polymers for automotive articles or applications, pipes or profiles for construction applications is provided.

In another aspect of the present invention, the use of a heterophasic polypropylene (HECO) having i) the melt flow rate $MFR_2$ (230° C., 2.16 kg) measured according to ISO 1133 of the heterophasic polypropylene is at least 30 g/10 min, ii) the relative amount of the xylene cold soluble (XCS) fraction is at least 10.0 wt.-%, and iii) the intrinsic viscosity of the XCS fraction of the heterophasic polypropylene measured in decalin according to DIN ISO 1628/1 at 135° C. is at least 2.0 dl/g, as compatibilizer for polyolefin blends A) between a copolymer of ethylene and one or more C4 to C19 alpha olefin B) and a reinforcing mineral filler D) is provided.

According to another aspect of the present invention, a process for producing a polyolefin composition as defined herein is provided. The process comprises the steps of
  a) providing a blend of at least two different polyolefins in an amount from 40 to 80 wt.-%, based on the total weight of the polyolefin composition, the blend of at least two different polyolefins comprises more than 65 wt.-%, based on the total weight of the polyolefin blend, of polypropylene,
  b) providing a heterophasic polypropylene (HECO) in an amount from 14 to 60 wt.-%, based on the total weight of the polyolefin composition, wherein
    i) the melt flow rate $MFR_2$ (230° C., 2.16 kg) measured according to ISO 1133 of the heterophasic polypropylene is higher than 30 g/10 min,
    ii) the relative amount of the xylene cold soluble (XCS) fraction is at least 10.0 wt.-%, and
    iii) the intrinsic viscosity of the XCS fraction of the heterophasic polypropylene measured in decalin according to DIN ISO 1628/1 at 135° C. is at least 2.0 dl/g,
  c) providing a copolymer of ethylene and one or more C4 to C19 alpha olefin in an amount from 3 to 12 wt.-%, based on the total weight of the polyolefin composition, the copolymer having a density measured according to ASTM D792 in the range of 850 to 885 g/m³ and a melt flow rate $MFR_2$ (190° C., 2.16 kg) measured according to ISO 1133 in the range of 0.05 to 5 g/10 min,
  d) providing a reinforcing mineral filler in an amount from 3 to 12 wt.-%, based on the total weight of the polyolefin composition, and
  e) melting and mixing the blend of at least two different polyolefins of step a) with the heterophasic polypropylene (HECO) of step b), the copolymer of ethylene and one or more C4 to C19 alpha olefin of step c) and the reinforcing mineral filler of step d).

According to one embodiment of the present process, the blend of at least two different polyolefins is a recycled polyolefin which is recovered from waste polyolefin material derived from post-consumer and/or post-industrial waste, and/or the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and most preferably from 22 to 35 wt.-%, based on the total weight of polyolefin blend, of polyethylene.

According to another embodiment of the present process, the process further comprises a step a1) of producing the recycled polyolefin of step a) by melting and mixing the waste polyolefin materials derived from post-consumer and/or post-industrial waste.

In the following, the details and preferred embodiments of the inventive polyolefin composition will be described in more detail. It is to be understood that these technical details and embodiments also apply to the inventive process and uses, as far as applicable.

Component A)

The polyolefin composition comprises 40 to 80 wt.-%, based on the total weight of the polyolefin composition, of a blend of at least two different polyolefins. It may further comprise minor amounts of other thermoplastic polymers with sufficient thermal stability for processing at 200-220° C., like styrene homo- and copolymers (GPS, HIPS, SAN, ABS), polyesters (PET, PBT) and/or polyamides (PA-6, PA-66) in a total amount not exceeding 5 wt.-%.

The expression "at least two" different polyolefins means that two or more kinds of polyolefins are present in the blend.

According to one embodiment of the present invention, only two kinds of polyolefins are present in the blend. According to another embodiment of the present invention, a mixture of three or more kinds of polyolefins are present in the blend.

It is appreciated that the term "different" means that the two or more kinds of polyolefins differ in their composition, such as the specific monomer and/or monomer/comonomer content, and/or their physical properties, such as density as determined in accordance with ASTM D792, melt flow rate (MFR) as determined in accordance with ISO 1133 (at 230° C.; 2.16 kg load) or melting temperature. Preferably, the at least two different polyolefins differ in composition.

In one embodiment, the polyolefin composition comprises 45 to 80 wt.-% and preferably from 50 to 80 wt.-%, based on the total weight of the polyolefin composition, of the blend of at least two different polyolefins. For example, the polyolefin composition comprises 52 to 78 wt.-%, based on the total weight of the polyolefin composition, of the blend of at least two different polyolefins.

It is appreciated that the blend of at least two different polyolefins comprises at least 65 wt.-%, based on the total weight of polyolefin blend, of polypropylene. Preferably, the blend of at least two different polyolefins comprises from 65 to 95 wt.-% and more preferably from 65 to 90 wt.-%, based on the total weight of polyolefin blend, of polypropylene. For example, the blend of at least two different polyolefins comprises from 65 to 85 wt.-% and most preferably from 65 to 78 wt.-%, based on the total weight of polyolefin blend, of polypropylene.

Preferably the blend of at least two different polyolefins further comprises polyethylene. For example, the blend of at least two different polyolefins comprises from 1 to 35 wt.-%, more preferably from 8 to 35 wt.-%, even more preferably from 20 to 35 wt.-% and most preferably from 22 to 35 wt.-%, based on the total weight of polyolefin blend, of polyethylene.

In one embodiment, the blend of at least two different polyolefins thus comprises, preferably consists of,
a) from 65 to 95 wt.-%, more preferably from 65 to 90 wt.-%, even more preferably from 65 to 85 wt.-% and most preferably from 65 to 78 wt.-%, based on the total weight of polyolefin blend, of polypropylene, and
b) from 5 to 35 wt.-%, more preferably from 10 to 35 wt.-%, even more preferably from 15 to 35 wt.-% and most preferably from 22 to 35 wt.-%, based on the total weight of polyolefin blend, of polyethylene.

The polypropylene of the blend can comprise one or more polymer materials selected from the following:
I) isotactic or mainly isotactic propylene homopolymers;
II) isotactic random copolymers of propylene with ethylene and/or C4-C10 alpha-olefins, preferably ethylene and/or C4-C8 alpha-olefins, such as for example 1-butene, 1-hexene, 1-octene, 4-methyl-1-pentene, wherein the total comonomer content ranges from 0.05 to 20 wt.-%, or mixtures of said copolymers with isotactic or mainly isotactic propylene homopolymers;
III) heterophasic copolymers comprising an isotactic propylene homopolymer like (I) or random copolymers of propylene like (II), and an elastomeric fraction comprising copolymers of ethylene with propylene and/or a C4-C8 a-olefin, optionally containing minor amounts of a diene, such as butadiene, 1,4-hexadiene, 1,5-hexadiene, ethylidene-1-norbornene.

For example, a polypropylene suitable for use in the blend of at least two different polyolefins has a density of from 900 to 940 kg/m$^3$, preferably from 910 to 935 kg/m$^3$, and more preferably from 915 to 930 kg/m$^3$ as determined in accordance with ASTM D792 and a melt flow rate (MFR) of from 0.5 to 300 g/10 min, preferably from 1.0 to 150 g/10 min, and alternatively from 1.5 to 50 g/10 min as determined in accordance with ISO 1133 (at 230° C.; 2.16 kg load). Usually the melting temperature of the polypropylene of the polyolefin blend is within the range of 135 to 170° C., preferably in the range of 140 to 168° C., more preferably in the range from 142 to 166° C. In case it is a propylene homopolymer like item (I) above it will generally have a melting temperature of from 150 to 170° C., preferably from 155 to 168° C., and more preferably from 160 to 165° C. as determined by differential scanning calorimetry (DSC) according to ISO 11357-3. In case it is a random copolymer of propylene like item (II) above it will generally have a melting temperature of from 130 to 165° C., preferably from 135 to 165° C., and more preferably from 140 to 165° C. as determined by DSC according to ISO 11357-3.

Preferably, the polypropylene of the polyolefin blend does not comprise a heterophasic copolymer like item (III) above.

The polyethylene of the polyolefin blend is preferably a high density polyethylene (HDPE) or a linear low density polyethylene (LLDPE) or a long-chain branched low density polyethylene (LDPE).

The comonomer content of the polyethylene is usually below 50 wt.-% preferably below 25 wt.-%, and most preferably below 15 wt.-%, based on the total weight of the polyethylene.

Herein an HDPE suitable for use as polyethylene in this disclosure has a density as determined according to ASTM D792 of equal to or greater than 941 kg/m$^3$, preferably from 941 to 965 kg/m$^3$, more preferably from 945 to 960 kg/m$^3$. In one embodiment, the HDPE is an ethylene homopolymer. An HDPE suitable for use as polyethylene in this disclosure may generally have an MFR determined by ISO 1133 (at 190° C.; 2.16 kg load), of from 0.01 g/10 min to 50 g/10 min, preferably from 0.1 to 30 g/10 min, like from 0.5 to 20 g/10 min.

The HDPE may also be a copolymer, for example a copolymer of ethylene with one or more alpha-olefin monomers such as propylene, butene, hexene, etc.

An LLDPE suitable for use as polyethylene in this disclosure may generally have a density as determined with ASTM D792, of from 900 to 920 kg/m$^3$, or from 905 to 918 kg/m$^3$, or from 910 to 918 kg/m$^3$ and an MFR determined by ISO 1133 (at 190° C.; 2.16 kg load), of from 0.01 to 50 g/min, or from 0.1 to 30 g/10 min, like from 0.5 to 20 g/10 min. The LLDPE is a copolymer, for example a copolymer of ethylene with one or more alpha-olefin monomers such as propylene, butene, hexene, etc.

An LDPE suitable for use as polyethylene in this disclosure may generally have a density as determined with ASTM D792, of from 915 to 935 kg/m$^3$, and an MFR determined by ISO 1133 (190° C.; 2.16 kg), of from 0.01 to 20 g/min. The LDPE is an ethylene homopolymer.

The melting temperature of the polyethylene is preferably within the range of 100 to 135° C., more preferably in the range of 105 to 132° C.

In a preferred embodiment, the blend of at least two different polyolefins is a recycled polyolefin, which is recovered from waste plastic material derived from post-consumer and/or post-industrial waste. Next to polyolefins, it may further comprise minor amounts of other thermoplastic polymers with sufficient thermal stability for processing at 200-220° C., like styrene homo- and copolymers (GPS, HIPS, SAN, ABS), polyesters (PET, PBT) and/or polyamides (PA-6, PA-66) in a total amount not exceeding 5 wt.-%.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system or the Italian "Raccolta Differenziata" system.

The polyolefin blend is PP-rich, meaning that it comprises more PP than PE.

The term "waste" is used to designate polymer materials deriving from at least one cycle of processing into manufactured articles, as opposed to virgin polymers. As mentioned above, all kinds of polyethylene, preferably HDPE, LLDPE or LDPE, or polypropylene can be present.

Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE) etc.

The blend of at least two different polyolefins preferably has an MFR (230° C., 2.16 kg, ISO 1133) of 0.5 to 150 g/10 min, more preferably of 1 to 120 g/10 min and most preferably from 1.5 to 50 g/10 min.

The blend of at least two different polyolefins preferably has a density of from 900 to 940 kg/m$^3$, preferably from 910 to 935 kg/m$^3$, and more preferably from 915 to 930 kg/m$^3$ as determined in accordance with ASTM D792.

The polypropylene of the polyolefin blend is usually free of a disperse phase. Thus, the polypropylene of the polyolefin blend is usually not a heterophasic polymer.

Component B)

The polyolefin composition comprises from 14 to 60 wt.-%, based on the total weight of the polyolefin composition, of a heterophasic polypropylene (HECO).

In one embodiment, the polyolefin composition comprises 14 to 50 wt.-% and preferably from 14 to 40 wt.-%, based on the total weight of the polyolefin composition, of the heterophasic polypropylene (HECO). For example, the polyolefin composition comprises from 14 to 35 wt.-%, based on the total weight of the polyolefin composition, of the heterophasic polypropylene (HECO).

It is appreciated that the heterophasic polypropylene (HECO) of the present invention is especially advantageous as it functions as compatibilizer between the polyolefin blend, component A), the copolymer of ethylene and one or more C4 to C19 alpha olefin, component C), and the reinforcing mineral filler, component D).

The heterophasic polypropylene (HECO) according to this invention comprises a polypropylene (PP) as a matrix (M) and dispersed therein an elastomeric propylene copolymer (EC). Thus the polypropylene (PP) matrix contains (finely) dispersed inclusions being not part of the matrix (M) and said inclusions contain the elastomeric propylene copolymer (EC). The term inclusion indicates that the matrix (M) and the inclusion form different phases within the heterophasic polypropylene (HECO), said inclusions are for instance visible by high resolution microscopy, like electron microscopy or scanning force microscopy.

Preferably the heterophasic polypropylene (HECO) according to this invention comprises as polymer components only the polypropylene (PP) and the elastomeric propylene copolymer (EC). In other words, the heterophasic polypropylene (HECO) may contain further additives but no other polymer in an amount exceeding 2.0 wt-%, more preferably exceeding 1.0 wt.-%, like exceeding 0.5 wt.-%, based on the total heterophasic propylene copolymer (HECO). One additional polymer which may be present in such low amounts is a polyethylene which is a by-reaction product obtained by the preparation of heterophasic polypropylene (HECO) (see in detail below). Accordingly it is in particular appreciated that the heterophasic polypropylene (HECO) contains only the polypropylene (PP) matrix, the elastomeric propylene copolymer (EC) and optionally polyethylene in amounts as mentioned in this paragraph.

The heterophasic polypropylene (HECO) is featured by a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$ (230° C.). Accordingly, it is preferred that in the present invention the heterophasic polypropylene (HECO) has an MFR$_2$ (230° C.) of equal or more than 30 g/10 min, more preferably in the range of 30 to 200 g/10 min, even more preferably in the range of 30 to 180 g/10 min and most preferably in the range of 30 to 150 g/10 min.

Preferably, it is desired that the heterophasic polypropylene (HECO) is thermomechanically stable. Accordingly it is appreciated that the heterophasic propylene copolymer (HECO) has a melting temperature of at least 160° C., more preferably of at least 162° C., still more preferably in the range of 163 to 170° C.

Additionally it is preferred that the crystallization temperature of the heterophasic polypropylene (HECO) is at least 120° C., more preferably at least 122° C., still more preferably in the range of 120 to 135° C.

The heterophasic polypropylene (HECO) comprises apart from propylene also comonomers. Preferably the heterophasic polypropylene (HECO) comprises apart from propylene ethylene and/or C$_4$ to C$_8$ α-olefins. Accordingly the term "propylene copolymer" according to this invention is understood as a polypropylene comprising, preferably consisting of, units derivable from (a) propylene and (b) ethylene and/or C$_4$ to C$_8$ α-olefins.

The copolymers of the heterophasic polypropylene (HECO), i.e. the heterophasic polypropylene (HECO), the random propylene copolymer fractions of the matrix, and the elastomeric propylene copolymer (EC), comprise monomers copolymerizable with propylene, for example comonomers such as ethylene and/or C$_4$ to C$_8$ α-olefins, in particular ethylene and/or C$_4$ to C$_6$ α-olefins, e.g. 1-butene and/or 1-hexene. Preferably, the copolymers of the heterophasic polypropylene (HECO) comprise, especially consist of, monomers copolymerizable with propylene from the group consisting of ethylene, 1-butene and 1-hexene. More specifically the propylene copolymers of the heterophasic polypropylene (HECO) comprise—apart from propylene—units derivable from ethylene and/or 1-butene. In a preferred embodiment the propylene copolymers of the heterophasic polypropylene (HECO) comprise units derivable from ethylene and propylene only. Still more preferably the random propylene copolymer fractions of the matrix—if present—as well as the elastomeric propylene copolymer (EC) contain the same comonomers, like ethylene.

Accordingly, the elastomeric propylene copolymer (EC) is preferably an ethylene propylene rubber (EPR), whereas the polypropylene (PP) is either a random propylene copolymer (R-PP) or a propylene homopolymer (H-PP), the latter being preferred.

Additionally it is appreciated that the heterophasic polypropylene (HECO) preferably has a comonomer content equal or below 10 wt.-%, more preferably in the range of 2.0 to 10.0 wt.-%, more preferably in the range of 3.0 to 9.0 wt.-%, yet more preferably in the range of 3.5 to 7.0 wt.-%.

The xylene cold soluble (XCS) fraction measured according to ISO6427 (23° C.) of the heterophasic polypropylene (HECO) is at least 10.0 wt.-%, more preferably in the range of 10.0 to 20.0 wt.-%, like in the range of 10.0 to 18.0 wt.-%.

The heterophasic polypropylene (HECO) is in particular defined by the matrix (M) and the elastomeric propylene copolymer (EC) dispersed therein. Accordingly both components are now defined in more detail.

The matrix (M) is a polypropylene (PP), more preferably an isotactic polypropylene homopolymer or a random copolymer of propylene with ethylene and/or C4 to C8 alphaolefins. The matrix is preferably an isotactic polypropylene homopolymer.

Accordingly the comonomer content of the polypropylene (PP) is equal or below 1.0 wt.-%, yet more preferably not more than 0.8 wt.-%, still more preferably not more than 0.5 wt.-%, like not more than 0.1 wt.-%.

As mentioned above the polypropylene (PP) is preferably a propylene homopolymer (H-PP), more preferably an isotactic polypropylene homopolymer.

The expression propylene homopolymer as used throughout the instant invention relates to a polypropylene that consists substantially, i.e. of equal or below than 99.9 wt.-%, of propylene units. In a preferred embodiment only propylene units in the propylene homopolymer are detectable. The comonomer content can be determined by FT infrared spectroscopy, as described below in the example section.

In case the polypropylene (PP) is a random propylene copolymer (R-PP) it is appreciated that the random propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

Additionally it is appreciated that the random propylene copolymer (R-PP) has preferably a comonomer content in the range of more than 0.1 to 2.0 wt.-%, more preferably in the range of more than 0.1 to 1.6 wt.-%, yet more preferably in the range of 0.1 to 1.0 wt.-%. Thus, the comonomer content of the random propylene copolymer (R-PP) is preferably equal or less than 1.0 wt.-%.

The term "random" indicates that the comonomers of the propylene copolymer (R-PP), as well as of the first random propylene copolymer (R-PP1), the second random propylene copolymer (R-PP2), and third random propylene copolymer (R-PP3), are randomly distributed within the propylene copolymers. The term random is understood according to IUPAC (Glossary of basic terms in polymer science; IUPAC recommendations 1996).

As stated above the heterophasic polypropylene (HECO) has a rather high melt flow rate. Accordingly, the same holds true for its matrix (M), i.e. the polypropylene (PP). Thus, it is preferred that the polypropylene (PP) has a melt flow rate $MFR_2$ (230° C.) measured according to ISO 1133 in the range of 30.0 to 500.0 g/10 min, more preferably of 40.0 to 400.0 g/10 min, still more preferably in the range of 50.0 to 300.0 g/10 min.

Further it is appreciated that the matrix (M) of the heterophasic polypropylene (HECO) is featured by a moderately broad molecular weight distribution. Accordingly it is appreciated that the matrix of the heterophasic polypropylene (HECO), i.e. the polypropylene (PP), has a molecular weight distribution (MWD) of equal or less than 8.0, preferably of equal or less than 7.0, more preferably in the range of 3.0 to 7.0, still more preferably in the range of 3.5 to 6.5.

Additionally the polypropylene (PP) can be defined by its molecular weight. Thus it appreciated that the polypropylene (PP), i.e. the matrix, has a weight average molecular weight (Mw) measured by gel permeation chromatography (GPC; ISO 16014-4:2003) of equal or less than 175 kg/mol, more preferably of equal or less than 165 kg/mol, yet more preferably in the range of 75 to 160 kg/mol, still more preferably in the range of 80 to 150 kg/mol.

The xylene cold soluble (XCS) content of the polypropylene (PP), i.e. the matrix, is rather moderate. Accordingly, the xylene cold soluble (XCS) content measured according to ISO 6427 (23° C.) is preferably equal or less than 3.5 wt.-%, more preferably equal or less than 3.0 wt.-%, still more preferably in the range of 0.5 to 3.0 wt.-%, like in the range of 0.5 to 2.8 wt.-%.

The polypropylene (PP) may comprise at least two, e.g. at least three or four, more preferably three or four, yet more preferably consists of three or four, polypropylene fractions (PP1), (PP2), (PP3) and optionally (PP4), the three or four polypropylene fractions (PP1), (PP2), (PP3) and optionally (PP4) differ from each other by the melt flow rate $MFR_2$ (230° C.) measured according to ISO 1133.

Preferably the melt flow rate $MFR_2$ (230° C.) decreases from the first polypropylene fraction (PP1) to the third polypropylene fraction (PP3) or fourth polypropylene fraction (PP4). For example, the melt flow rate $MFR_2$ (230° C.) decreases from the first polypropylene fraction (PP1) to the second polypropylene fraction (PP2) and from the second polypropylene fraction (PP2) to the third polypropylene fraction (PP3), and if present, from the third polypropylene fraction (PP3) to the fourth polypropylene fraction (PP4). Accordingly the second polypropylene fraction (PP2) has a lower melt flow rate $MFR_2$ (230° C.) than the first polypropylene fraction (PP1) but a higher melt flow rate $MFR_2$ (230° C.) than the third polypropylene fraction (PP3). If present, the third polypropylene fraction (PP3) has a lower melt flow rate $MFR_2$ (230° C.) than the second polypropylene fraction (PP2) but a higher melt flow rate $MFR_2$ (230° C.) than the fourth polypropylene fraction (PP4).

Thus, the third polypropylene fraction (PP3) has the lowest melt flow rate $MFR_2$ (230° C.) of the three polypropylenes fractions (PP1), (PP2), and (PP3), more preferably of all polymers present in the polypropylene (PP), if the polypropylene (PP) comprises three fractions.

Alternatively, the fourth polypropylene fraction (PP4) has the lowest melt flow rate $MFR_2$ (230° C.) of the four polypropylenes fractions (PP1), (PP2), (PP3) and (PP4), more preferably of all polymers present in the polypropylene (PP), if the polypropylene (PP) comprises four fractions.

Preferably at least one of the polypropylene fractions (PP1), (PP2), (PP3) and optionally (PP4) is a propylene homopolymer, even more preferred at least two of the polypropylene fractions (PP1), (PP2), (PP3) and optionally (PP4) are propylene homopolymers.

Thus, it is preferred that at least the first polypropylene fraction (PP1) is a propylene homopolymer, a so called first propylene homopolymer (H-PP1). Even more preferred this first polypropylene fraction (PP1) has the highest melt flow rate $MFR_2$ (230° C.) of the three polypropylenes (PP1), (PP2), (PP3) and optionally (PP4).

Still more preferred, in addition to the first polypropylene fraction (PP1) either the second polypropylene fraction (PP2) or the third polypropylene fraction (PP3), or, if present, the third polypropylene fraction (PP3) is a propylene homopolymer. In other words it is preferred that the polypropylene (PP) comprises, preferably consists of, only one polypropylene fraction being a random propylene copolymer. Accordingly either the second polypropylene fraction (PP2) is a propylene homopolymer, so called second propylene homopolymer (H-PP2), or the third polypropylene fraction (PP3) is a propylene homopolymer, so called third propylene homopolymer (H-PP3), or, if present, the fourth polypropylene fraction (PP4) is a propylene homopolymer, so called fourth propylene homopolymer (H-PP4).

It is especially preferred that all polypropylene fractions (PP1), (PP2), (PP3) and optionally (PP4) are propylene homopolymers.

In the following the three polypropylene fractions (PP1), (PP2), and (PP3) and optional fourth polypropylene fraction (PP4) will be described in more detail.

Preferably the polypropylene (PP) is produced in a sequential polymerization process, preferably as described in detail below. Accordingly the three or four polypropylene fractions (PP1), (PP2), and (PP3) and optionally (PP4) are an intimate mixture, which is not obtainable by mechanical blending.

A further essential component of the heterophasic polypropylene (HECO) is the elastomeric propylene copolymer (EC) dispersed in the matrix, i.e. in the polypropylene (PP). Concerning the comonomers used in the elastomeric propylene copolymer (EC) it is referred to the information provided for the heterophasic polypropylene (HECO). Accordingly the elastomeric propylene copolymer (EC) comprises monomers copolymerizable with propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably the elastomeric propylene copolymer (EC) comprises, especially consists of, monomers copolymerizable with propylene from the group consisting of ethylene, 1-butene and 1-hexene. More specifically the elastomeric propylene copolymer (EC) comprises—apart from propylene—units derivable from ethylene and/or 1-butene. Thus in an especially preferred embodiment the elastomeric propylene copolymer (EC) comprises units derivable from ethylene and propylene only.

The properties of the elastomeric propylene copolymer (EC) mainly influence the xylene cold soluble (XCS) content as well as the amorphous phase (AM) of the final heterophasic polypropylene (HECO). Thus according to the present invention the amorphous phase (AM) of the heterophasic polypropylene (HECO) is regarded as the elastomeric propylene copolymer (EC) of the heterophasic polypropylene (HECO).

Accordingly one important requirement of the present invention is that the elastomeric propylene copolymer (EC) has a rather high weight average molecular weight. High intrinsic viscosity (IV) values reflect a high weight average molecular weight. Thus it is appreciated that the amorphous phase (AM) of the xylene cold soluble fraction (XCS) of the heterophasic polypropylene (HECO) has an intrinsic viscosity (IV) measured according to ISO 1628-1 (at 135° C. in decalin) of equal or higher than 2.0 dl/g, more preferably of equal or higher than 2.2 dl/g, i.e. 2.5 dl/g, still more preferably in the range of 2.2 to 5.0 dl/g, i.e. 2.2 to 5.0 dl/g, like in the range of 2.2 to 4.0, i.e. 2.2 to 3.8 dl/g.

Thus, the intrinsic viscosity (IV) of the XCS fraction measured according to ISO 1628-1 (at 135° C. in decalin) is equal or higher than 2.0 dl/g, more preferably of equal or higher than 2.2 dl/g, i.e. 2.5 dl/g, still more preferably in the range of 2.2 to 5.0 dl/g, i.e. 2.2 to 5.0 dl/g, like in the range of 2.2 to 4.0, i.e. 2.2 to 3.8 dl/g.

The comonomer content, preferably the ethylene content, within the elastomeric propylene copolymer (EC) is comparatively low. Accordingly in a preferred embodiment the comonomer content, more preferably ethylene content, of the amorphous phase (AM) of the xylene cold soluble fraction (XCS) of the heterophasic polypropylene (HECO) is less than 50.0 wt.-%, preferably below 45.0 wt.-%, more preferably below 42.0 wt.-%, yet more preferably in the range of 25.0 to 45.0 wt.-%, like 30.0 to 42.0 wt.-%.

The heterophasic polypropylene (HECO) according to this invention preferably comprises
(a) 70.0 to 90.0 wt.-%, more preferably 72.0 to 86.0 wt.-%, of the polypropylene (PP), and
(b) 10.0 to 30.0 wt.-%, more preferably 14.0 to 28.0 wt.-%, of the elastomeric copolymer (EC),
based on the total amount of the polypropylene (PP) and the elastomeric copolymer (EC), wherein the amount of the elastomeric copolymer (EC) corresponds to the amount of the amorphous fraction (AM) of the xylene cold soluble (XCS) fraction.

In one embodiment, the comonomer content, more preferably ethylene content, of the heterophasic polypropylene (HECO) is in the range of 2.0 to 15.0 wt.-%, preferably in the range of 3.0 to 10.0 wt.-% and most preferably in the range of 4.0 to 9.0 wt.-%, based on the total weight of the heterophasic polypropylene (HECO).

Additionally or alternatively, the heterophasic polypropylene (HECO) has a xylene cold soluble (XCS) fraction measured according to ISO 16152 (23° C.) in the range of 12.0 to 30.0 wt.-%, preferably in the range of 12.0 to 25.0 wt.-%, more preferably in the range of 12.0 to 20.0 wt.-% and most preferably in the range of 13.0 to 19.0 wt.-% based on the total weight of the heterophasic polypropylene (HECO).

The heterophasic polypropylene (HECO) as defined in the instant invention may contain up to 2.0 wt.-% additives, like nucleating agents and antioxidants, as well as slip agents and talc.

The heterophasic propylene copolymer (HECO) as defined above is preferably produced by a sequential polymerization process, comprising at least two reactors wherein first the matrix (M) being a polypropylene is produced and secondly the elastomeric propylene copolymer (EC) is produced in the presence of the matrix as defined below.

A preferred sequential polymerization process comprises at least one loop reactor and at least one subsequent gas phase reactor. Such a process can have up to 3 gas phase reactors.

The matrix (M) being a polypropylene is produced first, i.e. in the loop reactor, and subsequently transferred to the at least one gas phase reactor, where the polymerization of ethylene, propylene or a C4 to C10 alpha olefin or mixtures therefrom takes place in the presence of the matrix (M) being a polypropylene. It is possible that the so produced polymer is transferred to a second gas phase reactor.

A further possibility is that the matrix (M) being a polypropylene is produced in the loop reactor and the first subsequent gas phase reactor. The matrix (M) being a polypropylene is then transferred to the at least second gas phase reactor where the polymerization of ethylene and propylene or a $C_4$ to $C_{10}$ alpha olefin or mixtures therefrom takes place in the presence of the matrix (M) being a polypropylene. It is possible that the so produced polymer is transferred to a third gas phase reactor.

In a specific embodiment the heterophasic polypropylene (HECO) is prepared by sequential polymerization comprising three or four reactors wherein first the matrix (M) being a polypropylene is produced in the loop reactor and the first subsequent gas phase reactor. The matrix (M) being a polypropylene is then transferred to the second gas phase reactor where the polymerization of ethylene and propylene or a $C_4$ to $C_{10}$ alpha olefin or mixtures therefrom takes place in the presence of the matrix (M) being a polypropylene. The so produced polymer can then be transferred to the optional third gas phase reactor where the polymerization of ethylene and propylene or a $C_4$ to $C_{10}$ alpha olefin or mixtures therefrom takes place in the presence of the product obtained in the second gas phase reactor.

The polymerization takes place in the presence of highly stereospecific Ziegler-Natta catalysts or single-site catalysts like metallocene catalysts, known to the art skilled persons.

A suitable sequential polymerization process is, i.a. the Borstar® process of *Borealis* AG.

Preferably the heterophasic polypropylene (HECO) is produced by sequential polymerization if the elastomeric propylene copolymer (EC) is an ethylene-propylene copolymer.

If the elastomeric propylene copolymer (EC) is an ethylene-$C_4$ to $C_{10}$ alpha olefin, the heterophasic polypropylene (HECO) is preferably produced by mechanical blending.

Component C)

The polyolefin composition comprises from 3 to 12 wt.-%, based on the total weight of the polyolefin composition, of a copolymer of ethylene and one or more C4 to C19 alpha olefin.

In one embodiment, the polyolefin composition comprises 4 to 11 wt.-% based on the total weight of the polyolefin composition, of the copolymer of ethylene and one or more C4 to C19 alpha olefin. For example, the polyolefin composition comprises from 4 to 6 wt.-% or from 9 to 11 wt.-%, based on the total weight of the polyolefin composition, of the copolymer of ethylene and one or more C4 to C19 alpha olefin.

It is appreciated that the copolymer of ethylene and one or more C4 to C19 alpha olefin, i.e. component C), differs from the elastomeric propylene copolymer (EC) being present in the heterophasic polypropylene (HECO), i.e. component B). The α-olefin is preferably selected form the group consisting of 1-butene, 1-pentene, 1-hexene, 1-heptene and 1-octene. For example, the α-olefin is selected form the group consisting of 1-hexene and 1-octene. Most preferably the α-olefin is 1-octene. Preferably the copolymer of ethylene comprises at least units derivable from ethylene and 1-octene and may comprise other units derivable from a further α-olefin as defined in this paragraph. However it is in particular preferred that the copolymer of ethylene and one or more C4 to C19 alpha olefin comprises units only derivable from ethylene and 1-octene. Thus an ethylene-1-octene-polymer as component C) is most preferred.

The copolymer of ethylene and one or more C4 to C19 alpha olefin, i.e. component C), has a glass transition temperature Tg (measured with DMTA according to ISO 6721-7) of below −25° C., preferably below −28° C., more preferably below −30° C., more preferably below −45° C. and an intrinsic viscosity (measured in decalin according to DIN ISO 1628/1 at 135° C.) of at least 2.0 dl/g, preferably at least 2.1 dug, more preferably of at least 2.2 dl/g.

The glass transition temperature Tg (measured with DMTA according to ISO 6721-7) of the copolymer of ethylene and one or more C4 to C19 alpha olefin, i.e. component C), is usually −65° C. or above, preferably −60° C. or above and most preferably −58° C. or above.

The intrinsic viscosity (measured in decalin according to DIN ISO 1628/1 at 135° C.) of the copolymer of ethylene and one or more C4 to C19 alpha olefin, i.e. component C), is usually 8.0 dl/g or less, preferably 7.0 dl/g or less and most preferably 6.5 dl/g or less.

Preferably, the copolymer of ethylene and one or more C4 to C19 alpha olefin, i.e. component C), has an ethylene content from 70 to 98 wt.-% and more preferably from 75 to 95 wt.-%, based on the total weight of the copolymer.

In case the copolymer of ethylene and one or more C4 to C19 alpha olefin, i.e. component C), is a copolymer of ethylene and 1-octene it has preferably an ethylene content from 70 to 98 wt.-%, preferably from 75 to 95 wt.-%, more preferably from 80 to 93 wt.-% and most preferably from 85 to 93 wt.-%, based on the total weight of the copolymer.

The copolymer of ethylene and one or more C4 to C19 alpha olefin, i.e. component C), is different from the elastomeric propylene copolymer (EC) dispersed in the matrix (M) of the heterophasic polypropylene (HECO). Usually the copolymer of ethylene and one or more C4 to C19 alpha olefin, i.e. component C), differs from the elastomeric propylene copolymer (EC) with regard to the comonomers. It is appreciated that the elastomeric propylene copolymer (EC) comprises propylene units, while the copolymer of ethylene and one or more C4 to C19 alpha olefin, i.e. component C), is preferably free of propylene units.

It is appreciated that the copolymer of ethylene and one or more C4 to C19 alpha olefin, i.e. component C), has a rather low melt flow rate. Thus, it is preferred that the copolymer of ethylene and one or more C4 to C19 alpha olefin, i.e. component C), has a melt flow rate $MFR_2$ (190° C., 2.16 kg) measured according to ISO 1133 in the range of 0.05 to 5 g/10 min, more preferably of 0.1 to 4 g/10 min, still more preferably in the range of 0.2 to 2 g/10 min.

It is a further requirement of the present invention that the copolymer of ethylene and one or more C4 to C19 alpha olefin, i.e. component C), has a density of from 850 to 885 kg/m³, preferably from 855 to 880 kg/m³, and more preferably from 855 to 875 kg/m³ as determined in accordance with ASTM D792.

Component D)

The polyolefin composition further comprises from 3 to 12 wt.-%, based on the total weight of the polyolefin composition, of a reinforcing mineral filler.

In one embodiment, the polyolefin composition comprises 4 to 11 wt.-% based on the total weight of the polyolefin composition, of the reinforcing mineral filler. For example, the polyolefin composition comprises from 4 to 9 wt.-%, and preferably from 4 to 7 wt.-%, based on the total weight of the polyolefin composition, of the reinforcing mineral filler.

The reinforcing mineral filler, component D), is preferably an inorganic reinforcing mineral filler.

Suitable reinforcing mineral filler, component D), are selected from the group comprising talc, chalk, clay, mica, clay, wood fibres, glass fibres, carbon fibres and mixtures thereof. Preferably, the reinforcing mineral filler, component D), is selected from the group comprising talc, chalk, clay, mica and mixtures thereof. Most preferably, the reinforcing mineral filler is talc.

Before the talc is added it may be treated with various surface treatment agents, such as organic titanate coupling agents, silane coupling agents, fatty acids, metal salts of fatty acids, fatty acid esters, and the like, in a manner known in the state of the art. The talc may also be added without surface treatment. Preferably the talc is added without surface treatment.

The mean particle size $d_{50}$ of the reinforcing mineral filler, component D), is preferably between 0.5 and 40 µm, preferably between 0.7 and 20 µm, more preferably between 1.0 and 15 µm and most preferably between 1.0 and 5.0 µm.

The mean (or median) particle size is the particle diameter where 50% of the particles are larger and 50% are smaller. It is denoted as the $d_{50}$ or $D_{50}$. In principle, this value may be determined by any particle measuring techniques, for example measuring techniques based on the principle of light diffraction.

Other techniques for determining particle sizes include, for example, granulometry in which a uniform suspension of a small quantity of the powder to be investigated is prepared in a suitable dispersion medium and is then exposed to sedimentation. The percentage distribution of the particle sizes can be estimated from the correlation between size and density of the spherical particles and their sedimentation rate as determined by Stokes law and the sedimentation time. Other methods for determining particle size include microscopy, electron microscopy, sieve analysis, sedimentation analysis, determination of the surface density and the like.

The particle size data appearing in the present specification were obtained in a well known manner with a standard test procedure employing Stokes' Law of Sedimentation by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit".

Polyolefin Composition

The polyolefin composition of the present invention comprising components B), C) and D) has improved mechanical properties compared to compositions comprising only component A). That is to say, the combination of components B), C) and D) imparts a good balance of stiffness as well as impact strength and heat deflection temperature at reasonable melt flow rate to the blend of at least two different polyolefins, especially recycled PP/PE-blends.

The polyolefin composition comprises
A) 40 to 80 wt.-%, based on the total weight of the polyolefin composition, of the blend of at least two different polyolefins,
B) 14 to 60 wt.-%, based on the total weight of the polyolefin composition, of the heterophasic polypropylene (HECO),
C) 3 to 12 wt.-%, based on the total weight of the polyolefin composition, of the copolymer of ethylene and one or more C4 to C19 alpha olefin, and
D) 3 to 12 wt.-%, based on the total weight of the polyolefin composition, of the reinforcing mineral filler.

Preferably, the polyolefin composition comprises, more preferably consists of,
A) 45 to 80 wt.-%, more preferably from 50 to 80 wt.-%, and most preferably from 52 to 78 wt.-%, based on the total weight of the polyolefin composition, of the blend of at least two different polyolefins,
B) 14 to 50 wt.-%, more preferably from 14 to 40 wt.-%, and most preferably from 14 to 35 wt.-%, based on the total weight of the polyolefin composition, of the heterophasic polypropylene (HECO),
C) 4 to 11 wt.-%, more preferably from 4 to 6 wt.-% or from 9 to 11 wt.-%, based on the total weight of the polyolefin composition, of the copolymer of ethylene and one or more C4 to C19 alpha olefin, and
D) 4 to 11 wt.-%, more preferably from 4 to 9 wt.-%, and most preferably from 4 to 7 wt.-%, based on the total weight of the polyolefin composition, of the reinforcing mineral filler.

As already stated above, the polyolefin composition has a good balance of stiffness as well as impact strength and heat deflection temperature at reasonable melt flow rate, which is achieved by using the heterophasic polypropylene (HECO) as compatibilizer.

For example, the polyolefin composition preferably has a tensile modulus measured according to ISO 527-3 in the range of 1000 to 1800 MPa, more preferably in the range from 1100 to 1800 MPa and most preferably in the range from 1200 to 1800 MPa. In one embodiment, the tensile modulus (according to ISO 527-3) of the polyolefin composition according to the invention (comprising components B), C) and D)) is at least 5% higher, preferably at least 10% higher, than the tensile modulus (according to ISO 527-3) of the same composition without the components B), C) and D).

Additionally, the polyolefin composition preferably has Charpy Notched Impact Strength (according to ISO 179/1 eA, measured at +23° C.) in the range of 4.5 to 10.0 kJ/m$^2$, more preferably in the range from 5.0 to 9.8 kJ/m$^2$ and most preferably in the range from 6.0 to 9.6 kJ/m$^2$. In one embodiment, Charpy Notched Impact Strength (according to ISO 179/1 eA, measured at +23° C.) of the polyolefin composition according to the invention (comprising components B), C) and D)) is at least 20% higher, preferably at least 30% higher, than the Charpy Notched Impact Strength (according to ISO 179/1 eA, measured at +23° C.) of the same composition without the components B), C) and D).

Additionally, the polyolefin composition preferably has a heat deflection temperature (HDT) measured according to ISO 75 A in the range of 48 to 55° C., more preferably in the range from 49 to 54° C. and most preferably in the range from 49 to 53° C., like 49 to 52° C.

At the same time the polyolefin composition preferably has a reasonable melt flow rate. For example, the polyolefin composition preferably has a melt flow rate MFR$_2$ (230° C., 2.16 kg) measured according to ISO 1133 in the range of 15 to 35 g/10 min, more preferably in the range of 17 to 30 g/10 min and most preferably in the range of 17 to 25 g/10 min.

In view of the goods results achieved, the present invention refers in a further aspect to the use of a heterophasic polypropylene (HECO) having
i) the melt flow rate MFR2 (230° C., 2.16 kg) measured according to ISO 1133 of the heterophasic polypropylene is at least 30 g/10 min,
ii) the relative amount of the xylene cold soluble (XCS) fraction is at least 10.0 wt.-%, and
iii) the intrinsic viscosity of the XCS fraction of the heterophasic polypropylene measured in decalin according to DIN ISO 1628/1 at 135° C. is at least 2.0 dl/g, as compatibilizer for polyolefin blends A) between a copolymer of ethylene and one or more C4 to C19 alpha olefin B) and a reinforcing mineral filler D).

With regard to the definition of the heterophasic polypropylene (HECO), the polyolefin blend, the copolymer of ethylene and one or more C4 to C19 alpha olefin and the reinforcing mineral filler and preferred embodiments thereof, reference is made to the statements provided above when discussing the technical details of the polyolefin composition of the present invention and its components.

The polyolefin composition according to the present invention can be advantageously used in a compound with one or more virgin polymers for e.g. automotive articles or applications, pipes or profiles for construction applications. Next to virgin polypropylene(s) and/or polyethylene(s) such a compound may further comprise inorganic or organic reinforcements like talc, glass fibres or wood fibres.

Thus, in another aspect, the present invention refers to the use of the polyolefin composition, as defined herein, in a compound with one or more virgin polymers for automotive articles or applications, pipes or profiles for construction applications.

With regard to the definition of the polyolefin composition and preferred embodiments thereof, reference is made to the statements provided above when discussing the technical details of the polyolefin composition of the present invention and its components.

It is appreciated that the present invention also refers to a process for producing the polyolefin composition as defined herein. The process comprises the steps of
a) providing a blend of at least two different polyolefins in an amount from 40 to 80 wt.-%, based on the total weight of the polyolefin composition, the blend of at least two different polyolefins comprises more than 65 wt.-%, based on the total weight of the polyolefin blend, of polypropylene,
b) providing a heterophasic polypropylene (HECO) in an amount from 14 to 60 wt.-%, based on the total weight of the polyolefin composition, wherein
  i) the melt flow rate $MFR_2$ (230° C., 2.16 kg) measured according to ISO 1133 of the heterophasic polypropylene is higher than 30 g/10 min,
  ii) the relative amount of the xylene cold soluble (XCS) fraction is at least 10.0 wt.-%, and
  iii) the intrinsic viscosity of the XCS fraction of the heterophasic polypropylene measured in decalin according to DIN ISO 1628/1 at 135° C. is at least 2.0 dl/g,
c) providing a copolymer of ethylene and one or more C4 to C19 alpha olefin in an amount from 3 to 12 wt.-%, based on the total weight of the polyolefin composition, the copolymer having a density measured according to ASTM D792 in the range of 850 to 885 g/m$^3$ and a melt flow rate $MFR_2$ (190° C., 2.16 kg) measured according to ISO 1133 in the range of 0.05 to 5 g/10 min,
d) providing a reinforcing mineral filler in an amount from 3 to 12 wt.-%, based on the total weight of the polyolefin composition, and
e) melting and mixing the blend of at least two different polyolefins of step a) with the heterophasic polypropylene (HECO) of step b), the copolymer of ethylene and one or more C4 to C19 alpha olefin of step c) and the reinforcing mineral filler of step d).

With regard to the definition of the heterophasic polypropylene (HECO), the polyolefin blend, the copolymer of ethylene and one or more C4 to C19 alpha olefin and the reinforcing mineral filler and preferred embodiments thereof, reference is made to the statements provided above when discussing the technical details of the polyolefin composition of the present invention and its components.

For the purposes of the present invention, any suitable melting and mixing means known in the art may be used for carrying out melting and mixing step e). However, melting and mixing step e) preferably takes place in a mixer and/or blender, high or low shear mixer, high speed blender, or a twin-screw extruder. Most preferably, melting and mixing step e) takes place in a twin-screw extruder such as a co-rotating twin-screw extruder. Such twin-screw extruder are well known in the art and the skilled person will adapt the melting and mixing conditions (such as melting temperature, screw speed and the like) according to his process equipment.

It is appreciated that the blend of at least two different polyolefins is preferably a recycled polyolefin which is recovered from waste polyolefin material derived from post-consumer and/or post-industrial waste.

Additionally or alternatively, the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and most preferably from 22 to 35 wt.-%, based on the total weight of polyolefin blend, of polyethylene.

In one embodiment, the blend of at least two different polyolefins is a recycled polyolefin which is recovered from waste polyolefin material derived from post-consumer and/or post-industrial waste, or the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and most preferably from 22 to 35 wt.-%, based on the total weight of polyolefin blend, of polyethylene. For example, the blend of at least two different polyolefins is a recycled polyolefin which is recovered from waste polyolefin material derived from post-consumer and/or post-industrial waste.

Alternatively, the blend of at least two different polyolefins is a recycled polyolefin which is recovered from waste polyolefin material derived from post-consumer and/or post-industrial waste, and the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and most preferably from 22 to 35 wt.-%, based on the total weight of polyolefin blend, of polyethylene.

Preferably, the blend of at least two different polyolefins is a recycled polyolefin which is recovered from waste polyolefin material derived from post-consumer and/or post-industrial waste, and the blend of at least two different polyolefins comprises a) from 65 to 95 wt.-%, preferably from 65 to 90 wt.-%, more preferably from 65 to 85 wt.-% and most preferably from 65 to 78 wt.-%, based on the total weight of polyolefin blend, of polypropylene, and b) from 5 to 35 wt.-%, preferably from 10 to 35 wt.-%, more preferably from 15 to 35 wt.-% and most preferably from 22 to 35 wt.-%, based on the total weight of polyolefin blend, of polyethylene.

If the blend of at least two different polyolefins is a recycled polyolefin, the process preferably further comprises a step a1) of producing the recycled polyolefin of step a) by melting and mixing the waste polyolefin materials derived from post-consumer and/or post-industrial waste.

The following examples and tests will illustrate the present invention, but are not intended to limit the invention in any way.

EXPERIMENTAL PART

1. Methods

The following definitions of terms and determination methods apply for the above general description of the invention as well as to the below examples unless otherwise defined. $MFR_2$ (230° C.) was measured according to ISO 1133 (230° C., 2.16 kg load). $MFR_2$ (190° C.) was measured according to ISO 1133 (190° C., 5 kg or 2.1 kg load). Charpy notched impact strength is determined according to ISO 179/1 eA at 23° C. by using injection moulded test specimens of 80×10×4 mm$^3$ prepared in accordance with EN ISO 19069-2.

Tensile properties such as stress at yield, stress at break, strain at yield and strain at break were measured on injection molded samples according to ISO 527-2, Specimen type Multipurpose bar 1A, 4 mm thick. Tensile modulus was measured at a speed of 1 mm/min. Sample preparation was done according to ISO 1872-2.

Density was measured according to ASTM; D792, Method B (density by balance at 23° C.) on compression moulded specimen prepared according to EN ISO 1872-2 (February 2007) and is given in kg/m³.

Heat Deflection Temperature (HDT) was determined according to ISO 75 A with a load of 1.8 MPa using 80×10×4 mm³ test bars injection molded in line with EN ISO 1873-2.

Xylene cold solubles (XCS) content was determined at 23° C. according ISO 16152; first edition; 2005-07-01.

The amorphous content (AM) is measured by separating the above xylene cold soluble fraction (XCS) and precipitating the amorphous part with acetone. The precipitate was filtered and dried in a vacuum oven at 90° C.

$$AM\ \% = \frac{100 \times m1 \times v0}{m0 \times v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

Glass transition temperature Tg and storage modulus G' were determined by dynamic mechanical analysis (DMTA) according to ISO 6721-7. The measurements were done in torsion mode on compression moulded samples (40×10×1 mm3) between −100° C. and +150° C. with a heating rate of 2° C./min and a frequency of 1 Hz. While the Tg was determined from the curve of the loss angle (tan(δ)), the storage modulus (G') curve was used to determine the temperature for a G' of 40 MPa representing a measure for the heat deflection resistance.

Comonomer content, especially ethylene content, is measured with Fourier transform infrared spectroscopy (FTIR) calibrated with ¹³C-NMR. When measuring the ethylene content in polypropylene, a thin film of the sample (thickness about 250 μm) was prepared by hot-pressing. The area of absorption peaks 720 and 733 cm⁻¹ for propylene-ethylene-copolymers was measured with Perkin Elmer FTIR 1600 spectrometer.

Polyethylene content of the recyclate was determined using the DSC technique described above for determining the Melting temperature (Tm) and crystallization temperature (Tc). For the recyclate the polyethylene content was calculated from the PE melting enthalpy in DSC (Hm(PE)) associated to the lower melting point for the composition (Tm(PE)) in the range of 110 to 130° C. For the determination of the present invention for fully crystalline PE a melting enthalpy of 298 J/g and an average degree of crystallinity of 50% was assumed.

2. Examples

Materials Used

Component A)

Polyolefin Blends:

Purpolen PP is a recycled polymer mixture comprising polyethylene and polypropylene obtained from mtm plastics GmbH, Niedergebra, Germany, having a polyethylene content of 24.4 wt.-% and a polypropylene content of 68.6 wt.-%, determined by DSC analysis, an MFR₂ (230° C.; 2.16 kg) of 22.3 g/10 min and a density (ASTM D792) of 924 kg/m³. The melting points determined by DSC were 164° C. (PP) and 128° C. (PE).

Component B)

Compatibilizers:

The properties of the heterophasic copolymer 1 (HECO-1) are summarized in Table 1 below.

TABLE 1

Properties of the heterophasic propylene copolymer HECO-1

| | | HECO-1 |
|---|---|---|
| Loop | | |
| split | [wt.-%] | 35.5 |
| MFR₂ | [g/10 min] | 200 |
| XCS | [wt.-%] | 2.0 |
| Mw | [kg/mol] | 139 |
| GPR1 | | |
| split | [wt.-%] | 35.5 |
| MFR₂ of GPR1 | [g/10 min] | 150 |
| XCS of GPR1 | [wt.-%] | 2.0 |
| GPR2 | | |
| split | [wt.-%] | 14 |
| MFR₂ of GPR2 | [g/10 min] | 60 |
| XCS of GPR2 | [wt.-%] | 3.0 |
| C2 of GPR2 | [wt.-%] | 0.125 |
| GPR3 | | |
| Split | [wt.-%] | 15 |
| MFR₂ of GPR3 | [g/10 min] | 35 |
| C2 of GPR3 | [wt.-%] | 7.0 |
| IV(AM) | [dl/g] | 2.5 |
| C2(AM) | [wt.-%] | 38 |
| XCS of GPR3 | [wt.-%] | 16 |

The properties of the heterophasic copolymer 2 (HECO-2) are summarized in Table 2 below

TABLE 2

Properties of the heterophasic propylene copolymer HECO-2

| | | HECO-2 |
|---|---|---|
| Loop | | |
| split | [wt.-%] | 52 |
| MFR₂ | [g/10 min] | 160 |
| XCS | [wt.-%] | 2 |
| Mw | [kg/mol] | 149 |

TABLE 2-continued

Properties of the heterophasic propylene copolymer HECO-2

|  |  | HECO-2 |
|---|---|---|
| GPR1 |  |  |
| split | [wt.-%] | 34 |
| MFR$_2$ of GPR1 | [g/10 min] | 160 |
| XCS of GPR1 | [wt.-%] | 2 |
| GPR2 |  |  |
| split | [wt.-%] | 14 |
| MFR$_2$ of GPR2 | [g/10 min] | 95 |
| XCS of GPR2 | [wt.-%] | 15 |
| C2 of GPR2 | [wt.-%] | 7 |
| C2(AM) | [wt.-%] | 39 |
| IV(AM) | [wt.-%] | 2.3 |

Component C)
Copolymer of Ethylene:
Queo® 2M138 (Ethylene/octene plastomer commercially available from Borealis AG, Austria) having a MFR$_2$ (190° C.; 2.16 kg) of 0.5 g/10 min, and a density of 862 kg/m$^3$. The intrinsic viscosity of this copolymer as measured in decalin at 135° C. is 2.3 dl/g.

Component D)
Mineral Filler:
Imerys Jetfine 3CA (talc) with a mean (or median) particle size of 1.3 μm.

The blends of Component A), B), C) and D) were prepared on a Coperion ZSK 25 co-rotating twin-screw extruder equipped with a mixing screw configuration with an L/D ratio of 25. A melt temperature of 200-220° C. was used during mixing, solidifying the melt strands in a water bath followed by strand pelletization. The pure materials for the comparative examples were subjected to the same extrusion, resulting in some MFR increase as usual.

The amounts of the different components and the mechanical properties of the blends comprising HECO-1 are summarized in Table 3.

TABLE 3

Composition and mechanical properties of the blends comprising HECO-1

|  | CE1 | CE2 | IE1 | IE2 |
|---|---|---|---|---|
| Purpolen PP | 100 |  | 60 | 55 |
| HECO-1 |  | 100 | 30 | 30 |
| Copolymer of ethylene |  |  | 5 | 5 |
| Talc |  |  | 5 | 10 |
| MFR$_2$ 230° C./2.16 kg [g/10 min] | 22.3 | 38.0 | 22.4 | 19.2 |
| Ash content [wt.-%] | 1.4 | — | 6.0 | 6.0 |
| Tensile modulus [MPa] | 1285 | 1480 | 1565 | 1440 |
| Tensile stress at yield [MPa] | 24.9 | 26.7 | 23.47 | 21.87 |
| Tensile strain at yield [%] | 5.6 | 4.8 | 4.09 | 4.41 |
| Tensile stress at break [MPa] | 19.8 | 18.1 | 18.7 | 16.4 |
| Tensile strain at break [%] | 14.3 | 24.9 | 15.2 | 24.6 |
| Charpy NIS 23° C. [kJ/m$^2$] | 5.3 | 3.1 | 7.6 | 8.8 |
| HDT A [° C.] | 51 | 54 | 52 | 51 |

From table 3, it can be gathered that the impact strength could be increased to 7.6 kJ/m$^2$ at high stiffness of 1565 MPa and processability by adding component B), component C) and component D) (IE1) compared to CE1 and CE2. With 1E2, it was possible to reach 8.8 kJ/m$^2$ notched impact strength at room temperature with a stiffness of 1440 MPa. HDT was still as high as of the pure polyolefin blend (Purpolen PP). All inventive examples have a relatively high MFR$_2$ of around 20 g/10 min.

The amounts of the different components and the mechanical properties of the blends comprising HECO-2 are summarized in Table 4.

TABLE 4

Composition and mechanical properties of the blends comprising HECO-2

|  | CE1 | CE3 | IE3 | IE4 |
|---|---|---|---|---|
| Purpolen PP | 100 |  | 75 | 70 |
| HECO-2 |  | 100 | 15 | 15 |
| Copolymer of ethylene |  |  | 5 | 5 |
| Talc |  |  | 5 | 10 |
| MFR$_2$ 230° C./2.16 kg [g/10 min] | 22.3 | 102 | 23.7 | 20.5 |
| Ash content [wt.-%] | 1.4 | — | 6.2 | 11.0 |
| Tensile modulus [MPa] | 1285 | 1562 | 1419 | 1287 |
| Tensile stress at yield [MPa] | 24.9 | 29.6 | 22.6 | 21.0 |
| Tensile strain at yield [%] | 5.6 | 5.3 | 4.6 | 5.2 |
| Strength [MPa] | 24.9 | 15.2 | 22.6 | 21.0 |
| Strain at strength [%] | 5.6 | 5.1 | 4.6 | 5.2 |
| Charpy NIS 23° C. [kJ/m$^2$] | 5.3 | 3.5 | 7.1 | 8.9 |
| HDT A [° C.] | 51 | 52 | 50 | 49 |

As can be gathered from table 4, when using component B) in combination with components C) and D), 1E3, both stiffness and impact strength are increased significantly to 1419 MPa and 7.1 kJ/m$^2$ at a HDT of 50.4° C. and a MFR$_2$ of 23.7 g/10 min. A further increase in component B) to 10 wt.-% gives a boost in impact strength to 8.9 kJ/m$^2$ at a stiffness of 1287 MPa with an HDT of 49.3° C. and a MFR$_2$ of 20.5 g/10 min.

As demonstrated, the addition of component B) in combination with components C) and D) leads to a good balance of high stiffness, impact strength and heat deflection temperature as well as reasonable melt flow rate. Using the combination of components B), C) and D) according to the present invention in a blend of at least two different polyolefins leads to the desired balance of high stiffness/impact/heat deflection temperature at reasonable processability and thus makes the polyolefin composition suitable for its use in e.g. automotive applications.

The invention claimed is:
1. Polyolefin composition comprising:
A) 40 to 80 wt. %, based on the total weight of the polyolefin composition, of a blend of at least two different polyolefins, comprising at least 65 wt. %, based on the total weight of polyolefin blend, of polypropylene,
B) 14 to 50 wt. %, based on the total weight of the polyolefin composition, of a heterophasic polypropylene (HECO), wherein
 i) the melt flow rate MFR$_2$ (230° C., 2.16 kg) measured according to ISO 1133 of the heterophasic polypropylene is at least 30 g/10 min,
 ii) the relative amount of the xylene cold soluble (XCS) fraction is at least 10.0 wt.-%, and
 iii) the intrinsic viscosity of the XCS fraction of the heterophasic polypropylene measured in decalin according to DIN ISO 1628/1 at 135° C. is at least 2.0 dl/g,
C) 3 to 12 wt. %, based on the total weight of the polyolefin composition, of a copolymer of ethylene and one or more C4 to C19 alpha olefin having a density measured according to ASTM D792 in the range of 850 to 885 kg/m$^3$ and a melt flow rate MFR$_2$ (190° C., 2.16 kg) measured according to ISO 1133 in the range of 0.05 to 5 g/10 min, and

D) 3 to 12 wt. %, based on the total weight of the polyolefin composition, of a reinforcing mineral filler; wherein the polyolefin composition has a melt flow rate $MFR_2$ (230° C., 2.16 kg) measured according to ISO 1133 in the range of 15 to 35 g/10 min.

2. Polyolefin composition according to claim 1, wherein the blend of at least two different polyolefins comprises:
   a) from 65 to 95 wt. %, based on the total weight of polyolefin blend, of polypropylene, and
   b) from 5 to 35 wt. %, based on the total weight of polyolefin blend, of polyethylene.

3. Polyolefin composition according to claim 1, wherein the polyolefin composition has:
   i) a tensile modulus measured according to ISO 527-3 in the range of 1000 to 1800 MPa, and
   ii) a Charpy notched impact strength measured according to ISO 179/1eA at +23° C. in the range of 4.5 to 10.0 $kJ/m^2$, and
   iii) a heat deflection temperature (HDT) measured according to ISO 75 A in the range of 48 to 55° C.

4. Polyolefin composition according to claim 1, wherein the heterophasic polypropylene (HECO) has a xylene cold soluble (XCS) fraction measured according to ISO 16152 (23° C.) in the range of 12.0 to 30.0 wt. %, based on the total weight of the heterophasic polypropylene (HECO).

5. Polyolefin composition according to claim 1, wherein the heterophasic polypropylene (HECO) has a comonomer content in the range of 2.0 to 15.0 wt. %, based on the total weight of the heterophasic polypropylene (HECO).

6. Polyolefin composition according to claim 1, wherein the heterophasic polypropylene (HECO) comprises:
   a) 70 to 90 wt. % of a matrix (M) being a polypropylene selected from isotactic polypropylene homopolymers or random copolymers of propylene with ethylene and/or C4 to C8 alpha-olefins, and
   b) 10 to 30 wt. % of an elastomeric propylene copolymer (EC) dispersed in said matrix (M).

7. Polyolefin composition according to claim 6, wherein the matrix (M) of the heterophasic polypropylene (HECO) has:
   a) a melt flow rate $MFR_2$ (230° C., 2.16 kg) measured according to ISO 1133 in the range of 30 to 500 g/10 min.

8. Polyolefin composition according to claim 6, wherein the matrix (M) of the heterophasic polypropylene (HECO) has:
   a) a comonomer content of equal or less than 1.0 wt. %, and/or
   b) a xylene cold soluble (XCS) fraction measured according to ISO 16152 (23° C.) of equal or less than 3.5 wt. %, based on the total weight of the matrix.

9. Polyolefin composition according to claim 6, wherein:
   a) the comonomers of the elastomeric copolymer (EC) are ethylene and/or at least C4 to C10 alpha-olefin, and/or
   b) the amorphous phase (AM) of the xylene soluble fraction (XCS) of the heterophasic polypropylene (HECO) has a comonomer content of less than 50.0 wt. %.

10. A process for producing a polyolefin composition according to claim 1, the process comprising the steps of:
   a) providing a blend of at least two different polyolefins in an amount from 40 to 80 wt. %, based on the total weight of the polyolefin composition, the blend of at least two different polyolefins comprises more than 65 wt. %, based on the total weight the polyolefin blend, of polypropylene,
   b) providing a heterophasic polypropylene (HECO) in an amount from 14 to 50 wt. %, based on the total weight of the polyolefin composition, wherein;
      i) the melt flow rate $MFR_2$ (230° C., 2.16 kg) measured according to ISO 1133 of the heterophasic polypropylene is higher than 30 g/10 min,
      ii) the relative amount of the xylene cold soluble (XCS) fraction is at least 10.0 wt. %, and
      iii) the intrinsic viscosity of the XCS fraction of the heterophasic polypropylene measured in decalin according to DIN ISO 1628/1 at 135° C. is at least 2.0 dl/g,
   c) providing a copolymer of ethylene and one or more C4 to C19 alpha olefin in an amount from 3 to 12 wt. %, based on the total weight of the polyolefin composition, the copolymer having a density measured according to ASTM D792 in the range of 850 to 885 $kg/m^3$ and a melt flow rate $MFR_2$ (190° C., 2.16 kg) measured according to ISO 1133 in the range of 0.05 to 5 g/10 min,
   d) providing a reinforcing mineral filler in an amount from 3 to 12 wt.-%, based on the total weight of the polyolefin composition, and
   e) melting and mixing the blend of at least two different polyolefins of step a) with the heterophasic polypropylene (HECO) of step b), the copolymer of ethylene and one or more C4 to C19 alpha olefin of step c) and the reinforcing mineral filler of step d).

11. The process according to claim 10, wherein the blend of at least two different polyolefins is a recycled polyolefin which is recovered from waste polyolefin material derived from post-consumer and/or post-industrial waste, and/or the blend of at least two different polyolefins comprises:
   a) from 65 to 95 wt. %, based on the total weight of polyolefin blend, of polypropylene, and
   b) from 5 to 35 wt. %, based on the total weight of polyolefin blend, of polyethylene.

12. The process according to claim 11, wherein the process further comprises a step a1) of producing the recycled polyolefin of step a) by melting and mixing the waste polyolefin materials derived from post-consumer and/or post-industrial waste.

* * * * *